March 8, 1932. W. W. BLAKELY 1,848,989
VEHICLE HOLDDOWN
Filed Aug. 26, 1929

INVENTOR
William W. Blakely
BY Whittemore Hulbert
Whittemore Belknap
ATTORNEYS

Patented Mar. 8, 1932

1,848,989

UNITED STATES PATENT OFFICE

WILLIAM W. BLAKELY, OF DEXTER, MICHIGAN

VEHICLE HOLDDOWN

Application filed August 26, 1929. Serial No. 388,588.

This invention relates generally to devices for holding merchandise such as vehicles in suitable carriers such as freight cars while in transit, and consists of certain novel features of construction, combinations and arrangements of parts that will be hereinafter more fully described, and particularly pointed out in the appended claims.

Figure 1:
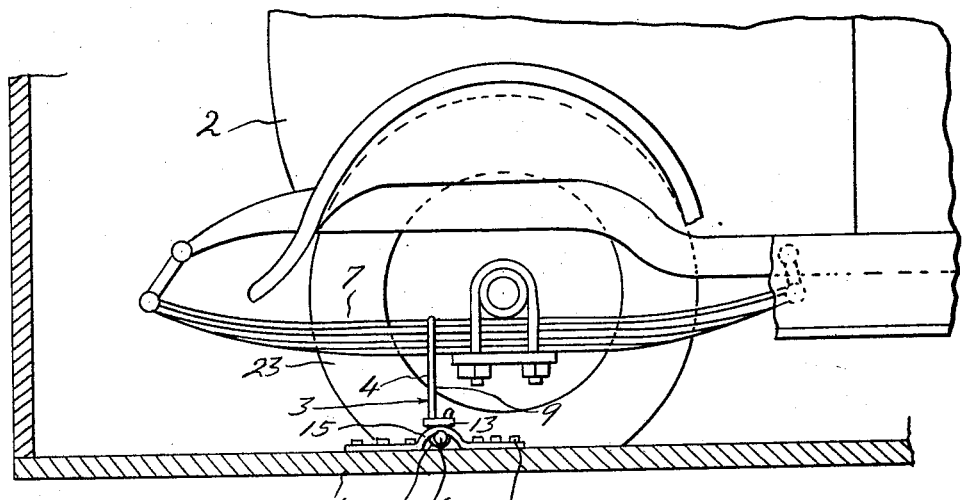
Figure 1 is a sectional view of a freight car and showing a hold-down embodying my invention applied to a motor vehicle.
Figures 2, 3, 4:
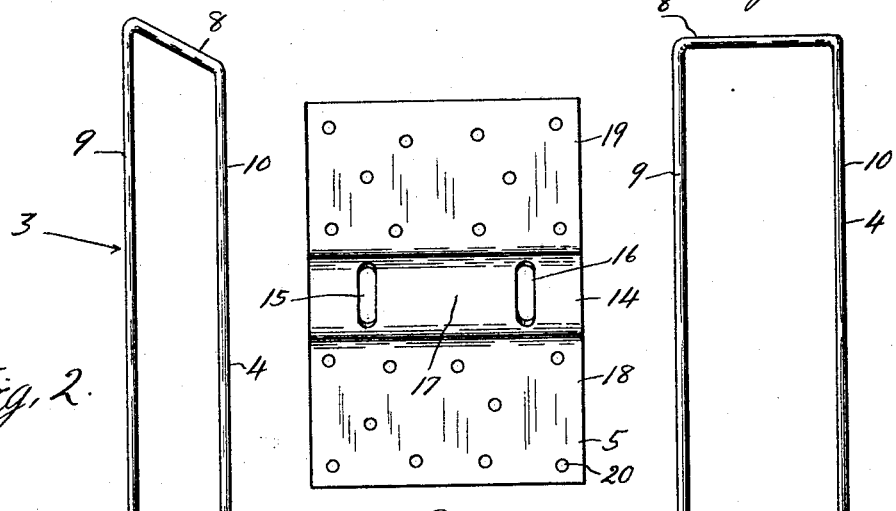
Figure 2 is a detail view of the hold-down per se.
Figure 3 is a detail view of the tie member.
Figure 4 is a detail view of the anchorage plate.

Referring now to the drawings, 1 is the flooring of a carrier, 2 is a motor vehicle on the flooring, and 3 is a device embodying my invention for holding the vehicle on the flooring. As shown, the device 3 comprises two separable parts 4 and 5 that are adapted to be connected together by a headed element such as the nail 6. Preferably the part 4 is engageable with a portion such as the spring 7 of the vehicle and is substantially U-shaped. This part 4 is a tie member between the vehicle and the plate 5 and is preferably formed of heavy gauge wire. Preferably the base 8 of the U is engageable with the top of the spring 7 and the legs 9 and 10 of the U extend downwardly from the base in substantially parallel relation upon opposite sides of the spring and are provided at their lower ends with parallel loops 11 and 12. As shown, these loops are formed by bending the wire laterally and upwardly through plate 13 on the legs 9 and 10 and then laterally outwardly over the plates 13.

The floor plate 5 serves as an anchorage means for both legs 9 and 10 of the tie member and for this purpose is provided intermediate of its ends with a raised transversely extending channel or trough-shaped portion 14 and has a pair of laterally spaced slots 15 and 16 therein for receiving the loops 11 and 12 of the tie member. As shown, these slots 15 and 16 extend transversely across the base 17 of the channel portion 14 but longitudinally of the plate, and the depth of the channel portion 14 is substantially equal to the length of the loops 11 and 12. Hence, when the loops 11 and 12 are in the slots 15 and 16, the nail 6 may be moved longitudinally of the channel portion 14 through the loops 11 and 12 and will connect the tie member 4 to the floor plate 5. As shown, substantial portions 18 and 19 of the plate are provided upon opposite sides of the channel portion 14 and are provided with openings 20 for receiving suitable securing elements such as the nails 21.

In use, the tie member 4 is applied to the spring 7 of the vehicle, the floor plate 5 is secured to the flooring beneath the tie member, and the tires 23 of the vehicle are then compressed by drawing the chassis of the vehicle downwardly toward the flooring, as described in detail in a companion application of mine, whereupon the loops 11 and 12 are inserted into the slots 15 and 16 and are engaged by and held in position by the nail 6 in the channel portion 14.

Thus, from the foregoing description it will be readily apparent that I have provided a very simple but effective hold-down in which the tie member and floor plate may be easily and quickly connected or disconnected. With such constructions the floor plates may be secured to the flooring at the proper points thereof and the tie members may be engaged with a suitable part of the motor vehicle and may be easily connected to the floor plate by the nail 6.

What I claim as my invention is:

1. In a hold-down device, a tie member having a plurality of leg portions, anchorage means for said tie member including a plate having slots receiving the leg portions, and a separable connection between said tie member and plate including an element substantially parallel to the plate and extending through the leg portions.

2. In a hold-down, an anchorage plate having a transversely extending channel portion provided with laterally spaced slots, a tie member having leg portions extending through said slots, and a connection between said plate and member including an element in the channel portion of said plate.

3. In a vehicle hold-down, a tie member having spaced leg portions, each leg portion having a substantially straight portion, and a portion return bent from said straight portion, elements respectively embracing the straight and return bent portions of said leg portions, a floor plate having spaced slots receiving the straight and return bent portions of said leg portions and constituting a seat for the elements aforesaid, and a connection between said leg portions including an element below a portion of said plate and extending between the straight and return bent portions aforesaid.

4. In a vehicle hold-down, a tie member having spaced leg portions, each leg portion having a substantially straight portion, and a portion return bent from said straight portion, elements respectively embracing the straight and return bent portions of said leg portions, a floor plate having spaced slots receiving the straight and return bent portions of said leg portions and constituting a seat for the elements aforesaid, and a connection between said tie member and plate including a securing element extending between the straight and return bent portions aforesaid.

In testimony whereof I affix my signature.

WILLIAM W. BLAKELY.